P. MUELLER & A. C. SCHUERMANN.
TOOL FOR FORMING GROOVES IN PIPES.
APPLICATION FILED OCT. 30, 1911.
1,100,248.
Patented June 16, 1914.
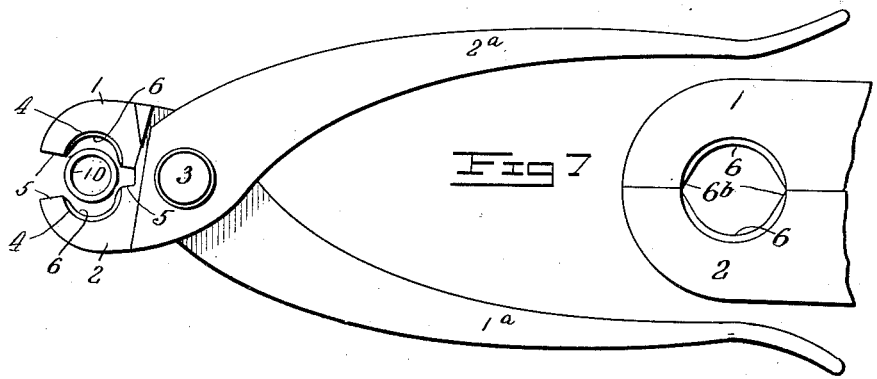
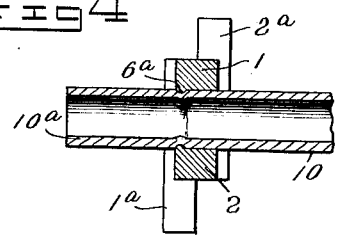
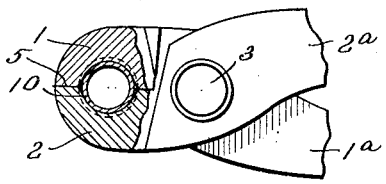
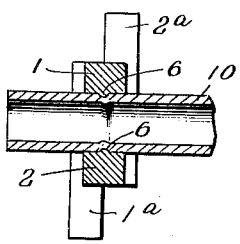
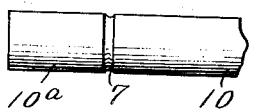
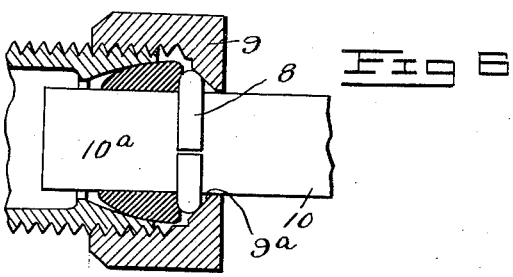
Witnesses
H. C. Polinette
A. L. Weaver
Inventors
Philip Mueller
Anton C. Schuermann
By Meyers, Cushman & Rea
Attorney

UNITED STATES PATENT OFFICE.

PHILIP MUELLER AND ANTON C. SCHUERMANN, OF DECATUR, ILLINOIS, ASSIGNORS TO H. MUELLER MFG. CO., OF DECATUR, ILLINOIS, A CORPORATION OF ILLINOIS.

TOOL FOR FORMING GROOVES IN PIPES.

1,100,248.  Specification of Letters Patent.  Patented June 16, 1914.

Application filed October 30, 1911. Serial No. 657,603.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Tools for Forming Grooves in Pipes, of which the following is a specification.

This invention relates to an improved tool for forming annular grooves in cylindrical metal tubing, in which grooves are to be seated metal rings or collars constituting shoulders or abutments for coupling nuts.

It is the purpose of this invention to provide a simple and easily operated tool by means of which the groove may be formed in any desired position in the pipe so that the shoulder ring may be located in the desired position and an adjustable coupling be thereby formed.

Further, the invention contemplates a tool to be grasped in the hand and applied to pipes fitted in the coupling so that the desired adjustment may be accurately obtained prior to the grooving of the pipe.

Another object of this invention is to provide a tool of this character which will when closed fit tightly around the pipe and embrace the pipe at all sides to prevent flattening of the pipe and which, when closed and oscillated will not pinch the pipe or cut through the wall thereof in forming the groove.

Briefly, the invention comprises a pair of opposed jaws adapted to embrace a pipe in which the groove is to be formed, each of said jaws having a semi-circular rib which is beveled at its ends and which will, by compressing the jaws, be forced into the wall of the pipe, and then by imparting a relative rotation or oscillation of the jaws relative to the pipe during such compression, result in the formation in the pipe of a true annular groove of any required depth to receive a ring or collar.

In the accompanying drawing which shows one embodiment of the invention, Figure 1 is an elevation of the improved tool. Fig. 2 is a similar view of the outer end of the tool, the jaws being shown in section and having a pipe therebetween. Fig. 3 is a transverse section taken through the jaw members and pipe. Fig. 4 is a similar view of a slightly modified form. Fig. 5 is an elevation of a pipe having the groove formed therein. Fig. 6 is a longitudinal sectional view of one form of pipe coupling utilizing a ring in the groove of the pipe. Fig. 7 is an enlarged detailed elevation of the ends of the jaw members of the tool showing the gaps in the groove forming ribs.

Referring to this drawing 1 and 2 designate opposed jaw members constituting the outer ends of handle members 1ª and 2ª which are pivotally connected together at 3 to provide a tool in the form of a pair of pliers. The jaws 1 and 2 are provided with semicircular depressions 4 extending transversely across the opposed or abutting faces of the jaws and between the inner and outer ends 5 of the jaws, as shown to advantage in Figs. 1 and 7. Concentric within the depressions 4 and rising from the walls thereof are relatively narrow registering ribs 6, the ribs 6 having their meeting ends tapered or beveled off at 6ᵇ to merge with the ends of the depressions 4 at the meeting faces of the jaws. When the jaws are closed the ribs 6 form a practically true circular rib having gaps at opposite sides as shown to advantage in Fig. 7. The ribs 6 may be located centrally of the depression 4, as shown in Fig. 3, or may be located flush with the sides of the jaws as shown in Fig. 4, at 6ª.

In operation when it is desired to form a coupling, such as is shown in Fig. 6, the pipe 10 is first adjusted to the coupling to determine the location of the shoulder ring 8. This having been determined the tool is then applied to that portion of the pipe where the shoulder ring is to be located and the jaws 1 and 2 closed upon the pipe. As the jaws are tightened upon the pipe the tool is oscillated back and forth around the pipe and the beveled or inclined ends of the ribs gradually work the ribs 6 into the smooth surface of the pipe and bend the same inwardly into the position shown in Figs. 3 and 4 without cutting the pipe or pinching the same. As the ribs 6 work into the sides of the pipe the walls of the recesses 4 snugly embrace the pipe entirely around the same to hold the pipe at true right angle to the plane of the ribs 6 and to prevent the flattening of the pipe. After the ribs 6 have been worked into the pipe the tool is removed therefrom and a groove 7 is left in the pipe as shown in Fig. 5. The ring 8 of the coupling is then placed in the groove 7, the end 10ª of the pipe is fitted to the coupling and the coupling nut 9 tightened to bring the inclined wall 9ª of the nut against the ring and bind the same in the groove 7 to secure the pipe to the coupling. Thus the pipe 10 is positively and securely held in the coupling to prevent any blow-outs thereof, and at the same time the shoulder for the coupling nut is adjustably positioned upon the pipe to accommodate the pipe to various distances between fittings and the usual permanently secured shoulder admitting of no adjustment of the pipe may be done away with.

What is claimed is—

A pipe grooving tool comprising a pair of pivoted crossed members having opposed jaws at one end and a pair of handles at the opposite end, said jaws having semi-circular registering depressions extending transversely across their abutting faces to form a true circular opening therebetween to snugly receive a pipe and hold it transversely of the tool, and registering semi-circular ribs projecting from the walls of said recesses and engaging the pipe around substantially its entire circumference and adapted to be embedded in the pipe when said jaws are closed, said ribs having their meeting ends beveled off to prevent the pinching and cutting of the pipe between the jaws.

In testimony whereof we have hereunto set our hands in presence of two subscribing witnesses.

PHILIP MUELLER.
ANTON C. SCHUERMANN.

Witnesses:
WILLIAM R. BIDDLE,
LEONARD F. MCKIBBEN.